United States Patent [19]

Baumgart

[11] Patent Number: 5,137,052
[45] Date of Patent: Aug. 11, 1992

[54] VALVE POSITION INDICATOR

[75] Inventor: Jurgen Baumgart, Huntington Beach, Calif.

[73] Assignee: Cryogenic Group Inc., Torrance, Calif.

[21] Appl. No.: 830,073

[22] Filed: Feb. 3, 1992

[51] Int. Cl.$^5$ ............................................. F16K 37/00
[52] U.S. Cl. .................................. 137/556; 137/553; 116/277; 116/282
[58] Field of Search .................. 137/553, 556, 556.3, 137/556.6; 116/277, 282

[56] References Cited

U.S. PATENT DOCUMENTS

| | | | |
|---|---|---|---|
| 1,033,866 | 7/1912 | Blaine | 116/282 |
| 2,400,553 | 5/1946 | Howard | 116/282 X |
| 2,599,286 | 6/1952 | Rockwell | 116/282 X |
| 4,674,531 | 6/1987 | Aalto et al. | 137/556 X |

FOREIGN PATENT DOCUMENTS

| | | | |
|---|---|---|---|
| 588184 | 11/1933 | Fed. Rep. of Germany | 116/277 |
| 18883 | 3/1956 | Fed. Rep. of Germany | 137/556 |
| 118502 | 4/1947 | Sweden | 116/277 |
| 538189 | 3/1977 | U.S.S.R. | 137/553 |

Primary Examiner—John Rivell
Attorney, Agent, or Firm—Harold L. Jackson

[57] ABSTRACT

The invention defines a position-indicating valve handle that is adapted to be mounted to the free end of a valve stem, wherein the handle includes a spiral groove in which a steel ball is free to move when the handle is turned by gravitational or magnetic force so that the ball will remain at a fixed point within the spiral groove (such as the lowest point where the handle is angularly disposed to the horizontal and gravitational force is used) as the handle is rotated. A transparent plate with indicia thereon is positioned to cover the spiral groove and allow the operator to visually determine by means of the location of the ball the approximate position of the valve stem within the body of the valve.

25 Claims, 1 Drawing Sheet

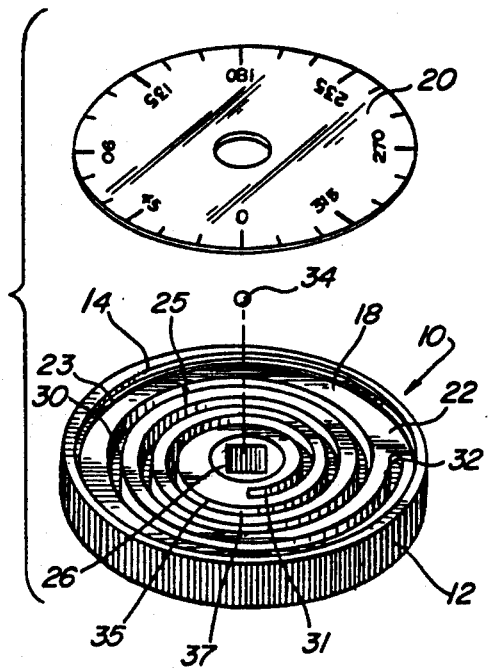
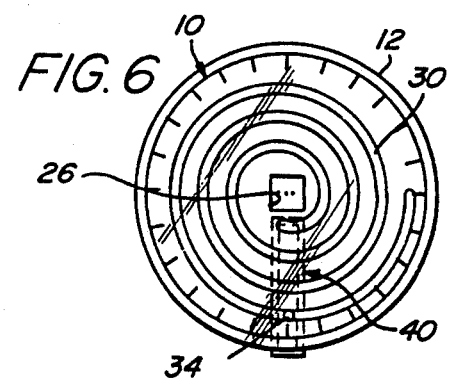
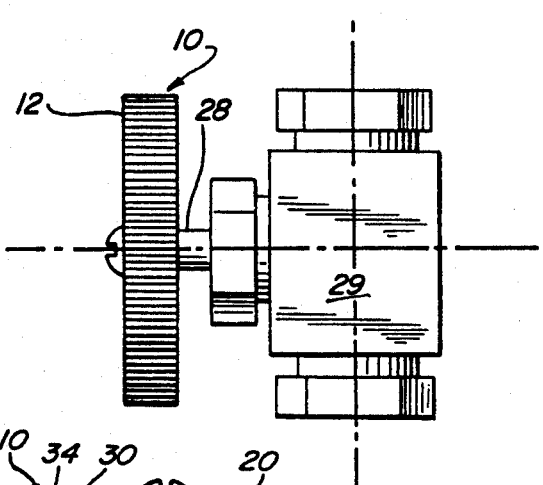
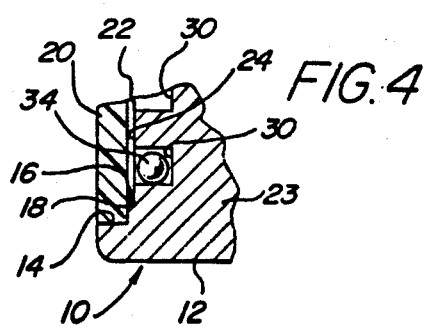
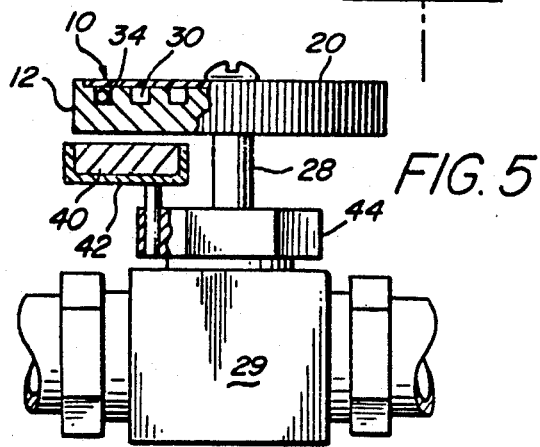

VALVE POSITION INDICATOR

BACKGROUND OF THE INVENTION

1. Field of the Invention

The present invention relates generally to a valve position indicator and more particularly to a position indicator that is constructed in a simple manner so as to clearly indicate both the number of turns and the degree of rotation of any given rotation of the valve stem to which the handle is mounted.

2. Description of the Prior Art

As is well known in the art, various problems and difficulties are encountered in providing suitable means for indicating the position of a valve stem in a valve. Many types of handles have been tried and suggested. However, these devices have various limitations that restrict their use to specifically designed valve apparatuses. That is, very often valve stem position-indicating devices are employed with high-technology type valves that are in themselves very complicated to operate, and thus are not suitable for most commonly used valve structures. Moreover, some types of handles that are employed to position valve stems are complicated, not only to operate, but are complicated in their structural arrangement, and thus become too expensive for use in simple fluid-flow systems that operate under conditions that require close examination or manual testing to determine the position of a valve stem. In many fluid systems it is very important and critical to indicate if a valve is in an "Off" or "Closed" position, particularly if it can be accomplished by simply noting the position of the associated valve handle.

In many flow system the rate of flow is very important and it is not easy to tell whether or not a valve is in a proper position relative to a required flow rate. Thus, the position of the stem of a valve can also be a very critical factor. The proper positioning of a valve stem is at all times necessary, particularly when dangerous or valuable substances might be flowing through the pipes or conduits of a flow system controlled by a particular valve.

As an example of valve handles that are adapted to indicate the position of a valve stem, one may look to the following United States Patents.

In U.S. Pat. No. 3,910,308, there is disclosed a signal handle for valves that includes a handle portion provided with a knurled exterior and a plurality windows formed in recesses located between raised portions of the knurls. The windows are operatively associated with an indicia member that fits within the recessed body of the handle portion. This particular device is designed to only indicate an open or a closed valve-stem position.

In U.S. Pat. No. 2,599,286, there is disclosed a valve position indicator that is particularly applicable with valves for accurately graduating fluid flow on a desired basis, particularly microscopic flows, and is not suitable for use with simple valve stem structures as is the present invention.

As the art indicates, there is no valve handle or other valve position indicating device that incorporates the necessary components to provide a simple means to determine the position of a valve stem at any given point between an open and closed position within a valve, and still provide a valve handle that is universally adaptable for use with most common types of valves.

SUMMARY AND OBJECTS OF THE INVENTION

The present invention comprises a valve position indicator preferably in the form of a handle adapted to be mounted on most commonly used valve devices which is easily attachable to a variety of valve stems. The indicator or handle defines a suitably shaped body member having an enlarged-diameter recess in which is defined an annular shoulder which itself defines a reduced-diameter shallow chamber. The bottom wall of the chamber is provided with a central mounting hole about which is formed positioning determining means such as a circumferential groove or preferably a spiraled groove. The spiraled groove is arranged to recede inwardly from the outer defined edge of the shallow chamber and terminate adjacent the central mounting hole. Locating means such as a suitable ball having a suitable weight is positioned within the groove so as to freely move within the groove as the handle is rotated about its central axis. With the valve handle and valve stem positioned at an angle with the horizontal, the ball will remain in the lower portion of the groove by the force of gravity.

Alternatively, the ball may be made of a ferrous material such as steel and a stationary magnet may be positioned adjacent (e.g. under) the body member so that the ball is maintained above the magnet when the handle is rotated. The body member may be positioned horizontally where magnetic lines of force are employed to keep the ball in a stationary radial position as the handle is rotated.

A transparent plate with indicia thereon is positioned within the enlarged recess and rests on the shoulder so as to encapsulate the ball within the groove of the chamber.

The present invention has for an important object a provision wherein a valve handle or indicator is preferably formed with one or more circumferential grooves about the central axis of the handle and arranged to receive a heavily weighted or ferrous ball so that when the handle is mounted on a valve stem, which may be angularly disposed (where gravitational force is used) or horizontally positioned (where magnetic lines of force are used), the ball will always remain in a fixed circumferential portion of a given spiraled groove by means of the gravitational or magnet force. The groove is preferably protectively covered by means of a transparent plate whereby the position of the ball can be readily viewed so as to easily determine the relative position of the stem hidden within the valve.

The novel features and advantages of the present invention, in addition to those mentioned above, will become apparent to those skilled in the art from reading the following detailed description in conjunction with the accompanying drawings wherein like parts are designated with the same reference numerals.

BRIEF DESCRIPTION OF THE DRAWINGS

FIG. 1 is a top plan view of the present invention wherein the force of gravity is relied upon to maintain the position-indicating ball at the bottom of the spiraled groove of the valve handle;

FIG. 2 is an exploded perspective view of the body of the handle, the ball and the transparent plate having typical indicia illustrated thereon;

FIG. 3 is a side-elevational view of the position-indicating valve handle shown mounted to a typical valve;

FIG. 4 is an enlarged cross-sectional view taken along line 4—4 of FIG. 1;

FIG. 5 is a side elevational view partially broken away, of another embodiment of the present invention in which a magnet is placed below the valve handle for maintaining the ball in a fixed position relative to the rotating valve; and FIG. 6 is a top plan view of the embodiment of FIG. 5.

DESCRIPTION OF THE PREFERRED EMBODIMENT

Referring more particularly to FIGS. 1 and 2, there is illustrated one preferred position-indicating device in the form of a valve handle, generally indicated at 10, having a circular configuration. However, any number of suitably shaped handle configurations may be employed in accordance with particular design requirements. The valve handle 10 is defined by a body member 12 formed from a suitable plastic or other suitable non-magnetic material such as brass. Body member 12 is provided with a cavity defined by an enlarged circular recess 14 and a counter recess 16 having a reduced diameter with respect to that of the enlarged recess, whereby an annular shoulder 18 is formed therebetween. See FIG. 4. Shoulder 18 establishes a means to support a transparent disc-like plate 20 slightly above the surface 22 of the base portion 23 of body member 12.

Accordingly, as seen in FIGS. 3 and 4, the transparent plate 20 is mounted over surface 22 of counter recess 16, which defines a display chamber 24, and a means for determining the position of the valve stem 28 within a suitable corresponding valve 29. This means for determining the position of the valve stem is indicated generally at 25 and will be described in more detail. A centrally located bore 26 is disposed in base portion 23 of body member 12 and is adapted to receive the outer free end of valve stem 28 which is shown mounted in valve 29, as indicated in FIG. 3. Typically, bore 26 is shown as having a square-shaped configuration. However, any suitable configuration can be used as long as the handle or body member 12 is keyed to the valve stem.

The position-determining means 25 is defined by a circumferential or spiraled groove 30 that originates at an inner end 31 which is positioned adjacent central bore 26. The spiral groove 30 includes a plurality of spiral sections, each section having substantially a 360 degree circumference that winds continuously around the central axis of body member 12 in a counter-clockwise direction so as to extend outwardly and terminate at an outer end 32 of groove 30 adjacent shoulder 18, as is illustrated in both FIGS. 1 and 2. The groove 30 may be of any suitable configuration that is readily adapted to freely receive a locating member, preferably a heavily weighted ball 34, such as a steel ball. The ball 34 must have a weight sufficient to allow it to easily seek and continuously remain at the bottom or lowermost point of the circumferential groove while valve handle 10 is being rotated in either a clockwise direction or counter-clockwise direction.

To properly operate the present apparatus by means of gravitational force, the handle 10 must be angularly disposed from that of a horizontal position. Accordingly, the weight of ball 34 or a like element will be movably activated by the force of gravity. Thus, it can be readily understood that, when handle 10 is resting at an angular displacement to that of a horizontal plane, the ball 34 will automatically position itself so as to rest at the lowermost point in a given curvature of any one of the spiral groove sections. A valve stem positioned horizontally, as indicated in FIG. 3, maximizes the force of gravity on the ball 34. In assembling the valve handle the ball 34 is first placed in groove 30 and then the transparent plate 20 is mounted on annular shoulder 18 within the enlarged recess 14 to provide a means to prevent ball 34 from falling out of the groove. The plate 20 is provided with indicia, which preferably includes numerals together with respective degree lines, as shown in FIG. 2. The "0" degree mark should be aligned with at least one of the terminating ends 31 or 32 of the spiral groove, preferably with outer end 31, as suggested in the exploded view of FIG. 2. It should be noted, however, that the indicia can also be suitably marked on surface 22 of counter recess 24.

Since various types of valves require one or more turns or rotations to be opened and closed, the number of continuous circumferential groove sections should correspond to the number of rotations that the respective valve stem must be turned to establish an open or closed mode. As an example, valve handle 10 is illustrated having a spiraled groove that includes three spiral sections that would allow at least three complete turns of 360 degrees each between an open and closed position. Accordingly, if ball 34 were resting in section 35 of the groove at a point indicated at 36, and aligned with the "0" degree mark, the valve stem would then be in a half-open position. Thus, if a valve stem needed only one turn to define either a closed or open position, then only one complete spiraled groove would be required to correspond to that particular valve-stem arrangement.

Referring now to FIGS. 5 and 6, in another preferred embodiment of the present invention, the position-indicating device includes the same body member 12 with the spiral groove 30, transparent plate 20 and the steel ball 34. In addition, a permanent bar magnet 40, which may be of the ceramic type, is positioned under the body member 12 with one of its poles (e.g. the north pole) in close proximity to the lower surface thereof. The magnet 40 is mounted in a bracket 42 which in turn may be clamped (via clamps 44) to the valve 29 or otherwise mounted in a fixed position relative to the rotating valve handle 10.

The valve position indicator of FIGS. 5 and 6 operates in a manner similar to the indicator of FIGS. 1–4 except that the valve body 12 should be positioned horizontally or close to the horizontal plane so that the magnetic lines of force exerted on the ball by the magnet 40 will not be overcome by the gravitational force. When the valve handle is turned the ball 34 automatically positions itself so as to rest at a point in a given curvature of the groove above the magnet 40.

It may thus be seen that the objects of the present invention set forth herein, as well as those made apparent from the foregoing description, are efficiently attained. While the preferred embodiments of the invention has been set forth for purposes of disclosure, modifications of the disclosed embodiments of the invention as well as other embodiments thereof may occur to those skilled in the art without involving any departure from the spirit and scope of my invention.

What is claimed is:

1. A valve position indicator for use with a valve stem whereby the positioning of the valve stem can be determined within a valve, said indicator comprising:
   a body member having a suitable configuration for mounting to the valve stem;
   a central bore formed in said body member to removably mount said body member to a free end of the valve stem;
   a cavity formed in said body member;
   position-determining means formed in the surface of said cavity;
   locating means movably positioned within said position determining means;
   a transparent plate mounted over said cavity whereby said positioning means and said locating means are covered; and
   indicia provided on said body to determine the position of said locating means.

2. The valve position indicator of claim 1, wherein said position-determining means comprises at least one circumferential groove, and wherein said locating means is defined by a movable member freely movable within said circumferential groove by means of gravitational force.

3. The valve position indicator of claim 1, wherein said position-determining means comprises a spiral groove having an inner terminating end and an outer terminating end, and wherein said locating means is defined by a heavily weighted movable member freely movable within said spiral groove by means of gravitational force.

4. The valve position indicator of claim 3, wherein said cavity is formed having an enlarged-diameter recess and a reduced diameter recess including an annular shoulder defined therebetween, whereby said transparent plate is mounted thereon, and wherein said heavily weighted movable member is defined by a metal ball.

5. The valve position indicator of claim 3, wherein said spiral groove is formed having a plurality of spiral sections that correspond to the number of rotations that is required to position the valve stem between an open or closed position.

6. The valve position indicator of claim 5, wherein each of said spiral sections is defined by a 360 degree circumferential groove.

7. The valve position indicator of claim 6, wherein said indicia is marked on said transparent plate.

8. The valve position indicator of claim 6, wherein said indicia is marked on said surface of said cavity.

9. The valve position indicator of claim 2 wherein the body member is in the form of a handle for turning the valve stem.

10. The valve position indicator of claim 1 wherein said position-indicating means comprises at least one circumferential groove and wherein said locating means is defined by a moveable member freely moveable within said circumferential groove by means of magnetic lines of force.

11. The valve position indicator of claim 10 wherein the magnetic lines of force are provided by a magnet positioned at a stationary point adjacent the body member.

12. The valve position indicator of claim 10, wherein said position-determining means comprises a spiral groove having an inner terminating end and an outer terminating end, and wherein said locating means is defined by a ferrous movable member freely movable within said spiral groove by means of magnetic lines of force.

13. The valve position indicator of claim 12, wherein said cavity is formed having an enlarged-diameter recess and a reduced diameter recess including an annular shoulder defined therebetween, whereby said transparent plate is mounted thereon, and wherein said movable member is defined by a ferrous metal ball.

14. The valve position indicator of claim 13, wherein said spiral groove is formed having a plurality of spiral sections that correspond to the number of rotations that is required to position the valve stem between an open or closed position.

15. The valve position indicator of claim 14, wherein each of said spiral sections is defined by a 360 degree circumferential groove.

16. The valve position indicator of claim 15, wherein said indicia is marked on said transparent plate.

17. In combination with a valve stem mounted in a valve wherein a given number of rotations are required by the valve stem to open or close the valve, and wherein a handle is mounted on the valve stem for the rotation of said valve stem, the improvement which comprises:
   a handle defined by a body member having a central bore disposed therein for mounting the handle to the valve stem;
   position-determining means formed in said body member so as to rotate with the handle;
   locating means movably positioned within said position determining means by the force of gravity so as to locate the position of the valve stem as the valve stem is rotated with respect to an open or closed position within the valve;
   a transparent plate mounted over a cavity whereby said positioning means and said locating means are covered, and wherein said position-determining means and said locating means are readable through said transparent plate; and
   indicia provided on said handle to determine the location of said locating means with respect to said position-determining means.

18. The combination as recited in claim 17, wherein said position-determining means comprises a spiral groove formed in said body member, said spiral groove having an inner terminating end and an outer terminating end, and said locating means being defined by a movable member freely mounted within said spiral groove, and wherein said handle and said valve stem are angularly disposed between a horizontal and vertical plane, whereby said movable member is caused to move by means of gravity to a location point within said spiral groove.

19. The combination as recited in claim 18, wherein said cavity is formed in said body member and has an enlarged-diameter recess and a reduced-diameter recess, so as to define an annular shoulder therebetween, whereby said transparent plate is mounted thereon, and wherein said movable member is defined by a steel ball.

20. The combination as recited in claim 19, wherein said spiral groove is formed having a plurality of spiral sections that correspond to the number of rotations that is required to position the valve stem between an open and closed position.

21. The combination as recited in claim 20, wherein each of said spiral sections is defined by a 360 degree circumferential groove.

22. The combination as recited in claim 21, wherein said indicia is marked on said transparent plate, and wherein said indicia includes numerals and degree marks.

23. The combination as recited in claim 20, wherein said inner terminating end of said spiral groove is located adjacent said central bore, and wherein said spiral groove winds continuously around the central axis of said body member in a counter-clockwise direction so as to expand outwardly therefrom and terminate at said outer terminating end adjacent said shoulder.

24. In combination with a valve stem mounted in a valve wherein a given number of rotations are required by the valve stem to open or close the valve, and wherein a handle is mounted on the valve stem for the rotation of said valve stem, the improvement which comprises:

a handle defined by a body member having a central bore disposed therein for mounting the handle to the valve stem;

position-determining means formed in said body member so as to rotate with the handle;

locating means movably positioned within said position determining means by a magnetic force so as to locate the position of the valve stem as the valve stem is rotated with respect to an open or closed position within the valve;

a transparent plate mounted over a cavity whereby said positioning means and said locating means are covered, and wherein said position-determining means and said locating means are readable through said transparent plate; and indicia provided on said handle to determine the location of said locating means with respect to said position-determining means.

25. The combination as recited in claim 24, wherein said position-determining means comprises a spiral groove formed in said body member, said spiral groove having an inner terminating end and an outer terminating end, and said locating means including a ferrous movable member freely mounted within said spiral groove and a magnet positioned adjacent the body member at a fixed location with respect thereto, and wherein said handle and said valve stem are horizontal, the magnet being arranged to produce magnetic lines of force for maintaining the moveable member along a radial reference line within said spiral grooves.

* * * * *